United States Patent [19]

Cederström

[11] Patent Number: 5,622,661

[45] Date of Patent: Apr. 22, 1997

[54] METHOD OF TREATING OF LAYERED LAMINATED PLASTIC OBJECTS

[75] Inventor: Rolf V. Cederström, Stockholm, Sweden

[73] Assignee: Creto (International) Ltd., Stockholm, Sweden

[21] Appl. No.: 256,269

[22] PCT Filed: Nov. 9, 1992

[86] PCT No.: PCT/SE93/00951

§ 371 Date: Sep. 9, 1994

§ 102(e) Date: Sep. 9, 1994

[87] PCT Pub. No.: WO94/11181

PCT Pub. Date: May 26, 1994

[30] Foreign Application Priority Data

Nov. 10, 1992 [SE] Sweden ................... 9203358

[51] Int. Cl.$^6$ ............... B32B 35/00; B29C 43/00
[52] U.S. Cl. ............... 264/36; 264/500
[58] Field of Search ............... 264/500, 80, 85, 264/36; 156/94, 98

[56] References Cited

U.S. PATENT DOCUMENTS

| 2,302,020 | 11/1942 | Frederick | 264/500 |
|---|---|---|---|
| 2,370,958 | 3/1945 | Hellier | 154/14 |
| 4,236,951 | 12/1980 | Krchma et al. | 156/71 |
| 4,260,439 | 4/1981 | Speer | 156/98 |
| 4,636,338 | 1/1987 | Neefe | 264/2.1 |
| 4,824,500 | 4/1989 | White et al. | 156/94 |
| 4,975,303 | 12/1990 | McKinnon | 427/263 |
| 5,273,701 | 12/1993 | Marlin | 264/85 |
| 5,334,335 | 8/1994 | Norville | 264/36 |

OTHER PUBLICATIONS

Water line, Hank Bowman, The Evening Star, Dec. 18, 1959.

*Primary Examiner*—Jan H. Silbaugh
*Assistant Examiner*—Robin S. Gray
*Attorney, Agent, or Firm*—Dowell & Dowell

[57] ABSTRACT

A method of treating laminated objects of plastics that have been damaged by osmosis or the like and which contain liquids and/or gases within laminate layers. Particularly within the damaged area the object is given such a temperature by controlled heating, that liquids are evaporated and gases are expanded in such a manner that covering layers are broken up and the damaged portion is exposed but also in such a manner that the damaged portion is not enduringly heated to a temperature exceeding 300° C. Preferably the heating is combined with exertion of a mechanical force against the object in way to remove the material which has been loosened due to the heating.

11 Claims, 1 Drawing Sheet

METHOD OF TREATING OF LAYERED LAMINATED PLASTIC OBJECTS

BACKGROUND OF THE INVENTION

The present invention relates to a method of curing preferably so called osmosis which may exist in practically all objects manufactured from plastic laminates. When osmosis is noted to such an extent that the objects are damaged, this is normally referred to as that the objects have been hit by bubonic plague, plastics plague, glass fiber hull plague or osmosis. This latter term will be used hereinafter.

One type of object that is frequently exposed to osmosis is a plastic boat. See for instance Batnytt 10 September 1990, pages 28–31. Therefore, the description below will refer to the treatment of boats, although it is generally applicable.

It is not clear why osmosis does not occur always, or why a chemical acid generating process starts in some cases but not in other cases. However, it is clear that osmosis in many cases is a big problem.

It has been speculated that the reason for osmosis is that there might be some constituents of the water that are active and that the bottom paint or dust that has contaminated the surface of the object during the manufacture functions as a catalyst.

The damages manifest themselves in that the acid, in addition to forming gas blisters outwardly, also corrodes inwardly. The size of the gas blisters gives no sure indication of how big the damage is that is concealed within the hull. The extent of the damage will be evident only when these have been exposed.

In order to cure damages resulting from osmosis it is necessary:

1. to localize all the damaged areas;
2. to expose the damage;
3. to remove both the formed acid and the damaged laminate material;
4. to clean up and dry out;
5. to build up the laminate to the original hull thickness and strength; and
6. to restore the hull on the outer surface by means of a water tight layer, such as a gel coat or a high molecular weight epoxy.

It is known that it is possible to use drying equipment of hyper absorption type, in the following referred to as hyab-equipment, for effectively drying laminate that has been made moist, such as at blasting or washing. See for instance, Batnytt, 10 September, 1990 page 29. This article refers to drying by means of the hyab-equipment as "hyper drying by means of compressed air and bottle gas heat".

The hyab-equipment uses compressed air and bottled gas in combination with each other and the drying medium consists of a dry, hot air flow that sweeps along the object at a high velocity.

The drying method of the hyab-equipment is based on the fact that the moisture is effectively removed from an object, in that the surface thereof is cooled by the evaporation of the moisture and that the moisture within the material according to the "law of the cold wall" is urged to move towards the surface thus cooled, where it is dried. Conversely, heat directed to the surface of an object urges the moisture deeper into the material. See for instance the HYAB-Comparison.

A visual localization of the damaged areas is not only time-consuming but may, indeed, be impossible to carry out, particularly if a hull has been standing on land for some time and has dried out, because the usually only small sized blisters have dried out and are no longer visible.

Despite this, particularly in hotter climates, a conventional method is to cure osmosis only when the hulls have been standing on land for an extend period in order to dry out. This timely extended method not only renders the localization of damages difficult but makes the whole curing of osmosis unnecessarily expensive. Yard rentals for storing the boats for an extended period of time, expenses for a continuous check of the moisture content of the hull, and the fact that the boat is not available for its intended purpose, are costs that may be reduced or eliminated entirely through practice of the present invention.

The object of the present invention is to quickly and effectively localize and cure damage due to osmosis.

The method encompassed by the present invention goes considerably further than the known drying technique which is utilized at first when the damaged areas have been localized and exposed.

By using, within the scope of the present invention, the temperature stability which characterizes the hyab-equipment, i.e. also by the higher temperatures that are not useful for drying, it is possible, without the harmful effects that may be the result of a heating by means of bottle gas burners only, to localized also damages in a hull that are concealed to the eye. Due to this, it is possible to advantageously directly treat wet objects, such as "sea-wet" boats, which gives the method a considerable advantage in time and thus savings.

This temperature stability may thus be utilized to not lastingly exceed the temperature up to 300° C., which insurance companies now for risk of fire reasons prescribe, for example, for hot jobs on roofs. Characterizing for the fire security at jobs with a hot compressed air jet is that, if an inflammable material should be put on fire, then extinguishing will be caused by the air jet if it is quickly placed at a somewhat increased distance, or is cooled by an immediate shut-off of the heat in that the air jet blows out the flame. When the heat admission is switched off entirely, the air jet acts strongly cooling, which means that there, due to the invention, is always available an effective fire extinguishing and cooling medium at the job site.

One type of tool that may be used for the method according to the invention is, for instance the HYAB-osmosis tools, which basically correspond to the known drying tools but which, among other things, are adapted for an immediate switching between heating and cooling functions.

However, by the method according to the invention it is achieved not only that the damage is localized, but also that evaporated acid and gases build up a pressure, that from inside breaks up the superposed material.

The combination of controlled comparatively strong heat or cooling, respectively, with a mechanical action by the strong compressed air jet makes it possible to clean the damaged area from both acid and eliminate damage in one operation. The need for sand blasting methods, both wet and dry, which due to environmental considerations are not possible to use within all yard areas, are eliminated through the invention.

Considerable savings are, beyond the time gain with respect to the treatment course, that the costs for blasting material and the removal thereof are eliminated, and that the hull need not be covered.

Other disadvantages of the known blasting methods are that they are effective, but simultaneously coarse, methods which, due to the difficulties of visually determining the existence of damage, are often utilized for the whole hull rather than limiting the destroying action of the blasting to only the damaged areas. Thus, by sand blasting, where it can be utilized at all, it should be noted that it is often times too efficient and, by its destroying action, may result in damage and considerable unnecessary work with, among other things, application of several replacing layers of glass fiber reinforcement in order to restore the original thickness and strength of the hull.

A general drawback inherent with all blasting is that the laminate becomes uneven and has to be built up anew in order to reach its original strength and smoothness. Due to the coarse operation of the blasting this rebuilding to original smoothness becomes time and material consuming, which results in unnecessary high costs.

By hull treatment within the scope of the invention the efforts may, as already mentioned, be concentrated to the localized areas where damage is to be found. Between the cured areas there are left intact and untouched areas that denote the original shape of the hull, prior to the curing. With these intact areas as templates, the restoring job is easier and the material consumption is reduced.

BRIEF DESCRIPTION OF THE DRAWINGS

The following embodiment of the method according to the invention is described with reference to the drawing figures.

DETAILED DESCRIPTION OF THE INVENTION

Figure 1:
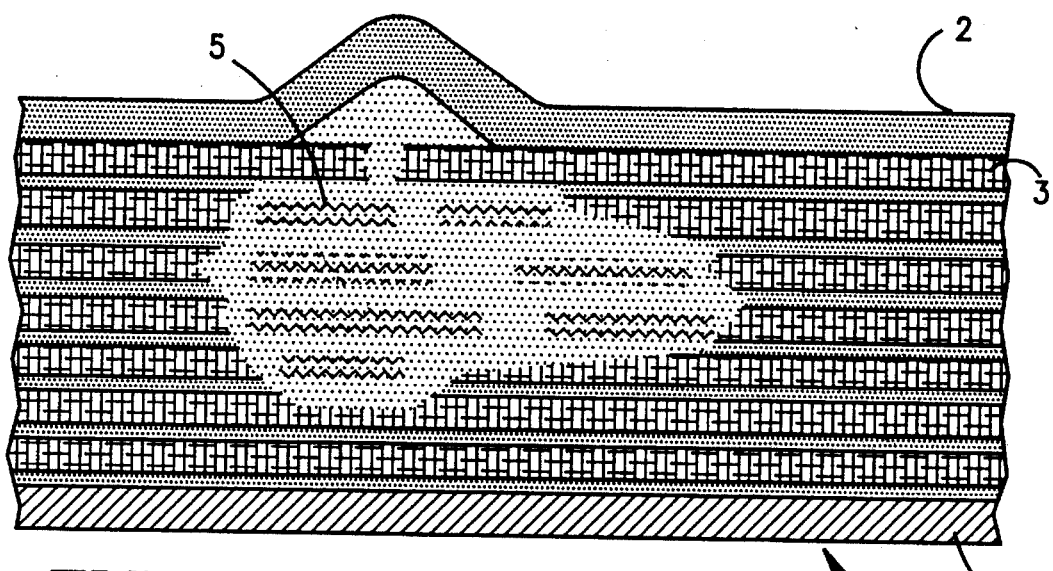
FIG. 1 illustrates how typical osmosis damage looks four years after damage has been initiated, and illustrates a cross-section of a boat hull 1, which is built up from the following layers, as seen from the outer surface: gel coat 2, fiberglass reinforced polyester 3, and a surface layer 4. The damaged portion 5 contains e.g. water, acid and gases.

The treatment according to the invention is uncomplicated and is divided into two main steps—cleaning includes washing and drying, respectively, and restoring.

The only requirements to guarantee a lasting quality of the treatment is an absolute fulfillment of the three main requisites of the method, are that:

1. acid and contaminants should be removed entirely,
2. the hull should be dried to a moisture content lower than 20% relative humidity, and
3. the protection against moisture penetration should be restored and preferably improved.

Cleaning

The first step of cleaning is performed to localize the damage, which may prove difficult in that the hull may be outwardly intact without outer signs which indicate an underlying osmosis-damage.

The second step is to expose a solid, fresh bottom from which the restoration may start up. Special, handheld tools, HYAB-Osmosis-tools, for compressed air and bottled gas are available for this purpose.

What the osmosis-tools, supplemented by the mechanical force of the hot compressed air jet, in fact bring about in practice is, with carefully controlled heating, to create such a temperature that liquids existing within the hull are evaporated and gases are expanded in such a manner that overlying layers are broken up and the damaged area is exposed, and in the same course, damaged freed material is blown away. To avoid heat damages, this must take place while observing that the damaged area is not lastingly heated to a temperature exceeding 300° C.

By means of the osmosis-tools, a localizing and exposing of the damaged areas is achieved in one operational step, and this only where there exits a damage, visible or not. The tools are balanced in such a way that, when their action is applied to fresh hull portions, existing paint layers will possibly be affected, but both gel coat and laminate remain unaffected.

All types of HYAB-tools are characterized by their gentle operation. As distinguished from sand blasting, dry or wet, the tools will remove only damaged material on exposing of a damaged area. Existing fiberglass reinforcement remains intact for re-use together with the material that is utilized for rebuilding the hull into its original dimension.

Cured damaged areas become next to stronger after a completed treatment.

The third step is a quick cooling of the exposed damaged area. Thereby it is also achieved that possible residual underlying acid and moisture move towards the surface and may be taken care of there. The tools use only the constant compressed air jet with a heating effect which is quickly adjustable according to the requirements. The compressed air that passes through the nozzle of the tool when the LP-gas has been shut off attains an improved cooling effect by its expansion.

The fourth step is to confirm that all acid and all other contaminants have been removed. This is easily performed by a repeated treatment of the surface while alternatingly heating and cooling until all residual acid has reached the surface and has been removed. As the acid is green or black, it is very easy to determine when the cleaning has been completed—which is the case when no more green or black substance can be seen.

The above method, carried out in a continuous operation on a few square inches each time ensures control of the working temperature and also guarantees that each portion of the hull will be checked during the osmosis-treatment.

The fifth and last step of the cleaning is a high pressure flushing with fresh water without detergents and drying to a moisture content not exceeding 20% relative humidity, which may be carried out within a day or so by means of the HYAB-drying tool as compared to conventional natural drying, which depending on the time of the year, may be found to require up to half a year, and sometimes even more.

Figure 2:
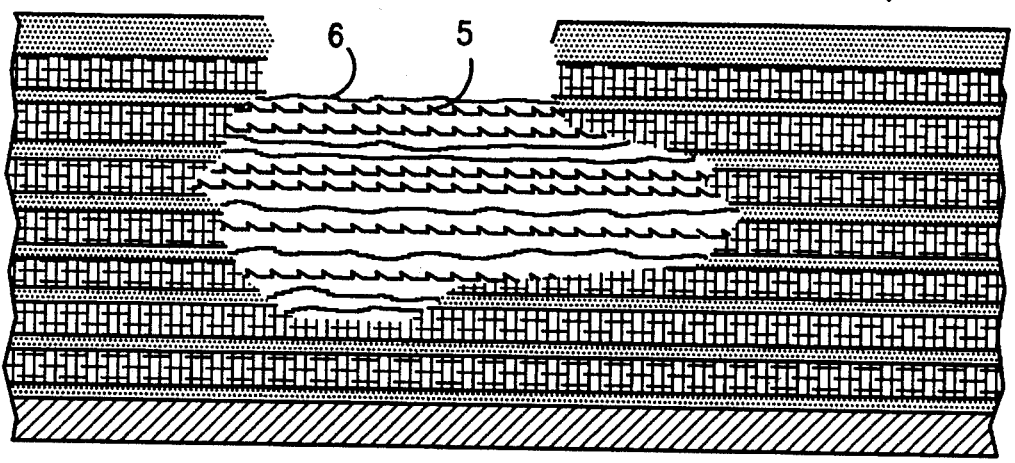
FIG. 2 illustrates a damage portion 5 that has been cleaned up and prepared for restoring and that comprises remaining useful glass fiber reinforcement 6.

FIG. 2 shows result when a damaged area, having been cleaned, including washing and drying, is ready for restoring operation.

Restoring

This includes rebuilding of the hull to its original strength and dimension and surface treatment to prevent water penetration in known manner.

Figure 3:
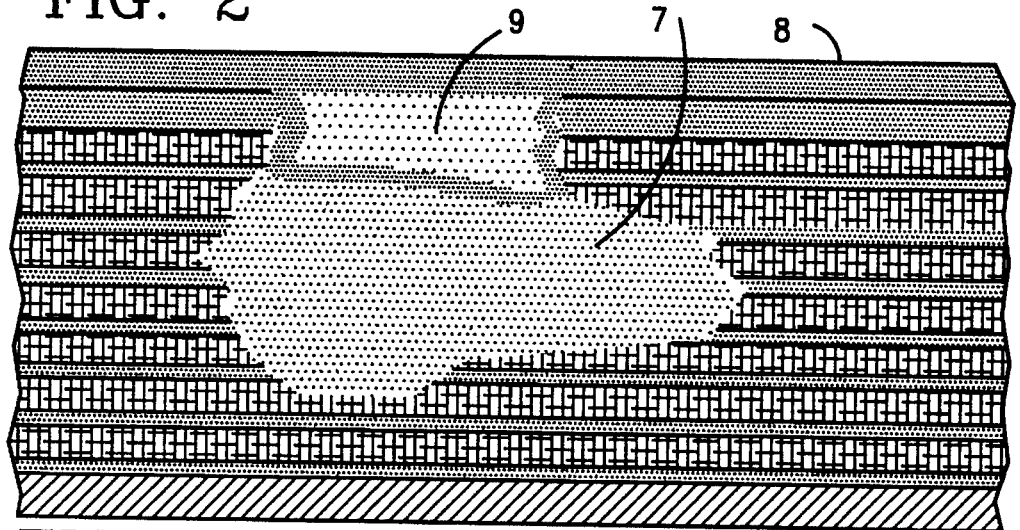
FIG. 3 illustrates the final result where the damaged portion has been repaired with penetrating epoxy 7, which is covered by a water resistant layer such as high molecular weight-epoxy paint 8 and filling of irregularities, conventionally using epoxy putty 9.

FIG. 3 shows a damaged area where curing according, to the present invention has been completed.

The present invention is not restricted to the above described example. Other heating and drying methods may be utilized in full or in part.

I claim:

1. A method of treating a layered, laminated plastic object having an internal damaged area containing fluids which internal damaged area is at least partially covered by at least one overlying layer, comprising the steps of:

initially heating the internal damaged area to a temperature effective to evaporate the contained fluids and expand the contained fluids to fracture the at least one overlying layer and expose the damaged area through the at least one overlying layer;

rapidly cooling the exposed damaged area;

then, alternatingly, further heating and rapidly cooling the exposed damaged area to remove contaminants and acids from within the object; and repairing the exposed damaged area.

2. The method of claim 1, wherein the fluids are selected from the group consisting of gases, liquids and combinations thereof.

3. The method of claim 1, wherein the step of initially heating comprises applying a mechanical force to the object to remove the at least one fractured overlying layer.

4. The method of claim 1, wherein the steps of rapidly cooling comprise applying chilled compressed air to the exposed damaged area.

5. The method of claim 4, wherein the compressed air is applied at a pressure of at least 4 bar.

6. The method of claim 1, wherein the step of initially heating the internal damaged area comprises using a temperature of up to 300° C.

7. The method of claim 1, wherein the step of repairing comprises placing epoxy in the exposed damaged area and applying a water resistant layer over the epoxy.

8. The method of claim 1, including the additional step of drying the exposed damaged area to a moisture content not exceeding 20% relative humidity after said step of alternatingly heating and rapidly cooling the exposed damaged area.

9. A method of repairing a boat hull having a layered, laminated plastic construction and having overlying layers covering internal damaged areas containing fluids therein, comprising the steps of:

heating selected areas of the boat hull to evaporate and expand the contained fluids to fracture the overlying layers and thereby expose the internal damaged areas through the overlying layers, the internal damaged areas reaching a temperature of up to 300° C.;

initially rapidly cooling the exposed damaged areas, the exposed damaged areas thereafter being repeatedly alternatingly heated and cooled to remove contained contaminants and acids from within the exposed damaged areas within the boat hull;

removing damaged laminate from the exposed damaged areas;

drying the exposed damaged areas to a moisture content not exceeding 20% relative humidity;

placing epoxy in the exposed damaged areas; and applying a water resistant layer over the epoxy.

10. The method of claim 1, comprising the further step of cleaning the exposed damaged area.

11. The method of claim 1, comprising the further step of drying the exposed damaged area.

* * * * *